(12) United States Patent
Oh

(10) Patent No.: US 9,785,335 B2
(45) Date of Patent: Oct. 10, 2017

(54) SYSTEMS AND METHODS FOR ADAPTIVE GESTURE RECOGNITION

(75) Inventor: Andy Oh, Hercules, CA (US)

(73) Assignee: Sling Media Inc., Foster City, CA (US)

( * ) Notice: Subject to any disclaimer, the term of this patent is extended or adjusted under 35 U.S.C. 154(b) by 139 days.

(21) Appl. No.: 12/978,949

(22) Filed: Dec. 27, 2010

(65) Prior Publication Data

US 2012/0167017 A1 Jun. 28, 2012

(51) Int. Cl.
| | |
|---|---|
| G06F 3/0488 | (2013.01) |
| H04N 1/00 | (2006.01) |
| G01C 21/36 | (2006.01) |
| G06F 3/01 | (2006.01) |
| G06F 3/0481 | (2013.01) |

(52) U.S. Cl.
CPC ....... *G06F 3/0488* (2013.01); *G01C 21/3664* (2013.01); *G05B 2219/35444* (2013.01); *G06F 3/017* (2013.01); *G06F 3/0481* (2013.01); *G06F 2203/04808* (2013.01); *H04N 1/00381* (2013.01)

(58) Field of Classification Search
USPC .................................................. 715/863, 822
See application file for complete search history.

(56) References Cited

U.S. PATENT DOCUMENTS

| | | | | |
|---|---|---|---|---|
| 5,471,578 A | * | 11/1995 | Moran et al. | 715/863 |
| 5,509,114 A | * | 4/1996 | Moran et al. | 345/443 |
| 5,809,267 A | * | 9/1998 | Moran et al. | 715/863 |
| 5,880,743 A | * | 3/1999 | Moran et al. | 345/473 |
| 5,966,460 A | | 10/1999 | Porter, III et al. | |
| 6,525,749 B1 | * | 2/2003 | Moran et al. | 715/863 |
| 7,401,299 B2 | * | 7/2008 | Thompson | 715/860 |
| 8,286,080 B2 | * | 10/2012 | Tai et al. | 715/721 |
| 8,587,422 B2 | * | 11/2013 | Andrews | B60N 2/002 340/438 |
| 8,704,792 B1 | * | 4/2014 | Kataoka | G06F 3/0416 345/173 |

(Continued)

FOREIGN PATENT DOCUMENTS

| | | |
|---|---|---|
| JP | 9091082 A | 4/1997 |
| WO | 2009072736 A1 | 6/2009 |

OTHER PUBLICATIONS

European Patent Office, International Searching Authority, "International Search Report" mailed Mar. 15, 2012; International Appln. No. PCT/US2011/063575, filed Dec. 6, 2011.

(Continued)

*Primary Examiner* — Jeffrey A Gaffin
*Assistant Examiner* — John M Heffington
(74) *Attorney, Agent, or Firm* — LK Global

(57) ABSTRACT

Systems and methods are described for adaptively recognizing gestures indicated by user inputs received from a touchpad, touchscreen, directional pad, mouse or other multi-directional input device. If a user's movement does not indicate a gesture using current gesture recognition parameters, additional processing can be performed to recognize the gesture using other factors. The gesture recognition parameters can then be adapted so that subsequent user inputs that are similar to the previously-rejected inputs will appropriately trigger gesture commands as desired by the user. Gestural data or parameters may be locally or remotely stored for further processing.

20 Claims, 2 Drawing Sheets

(56) References Cited

U.S. PATENT DOCUMENTS

Figure 1:
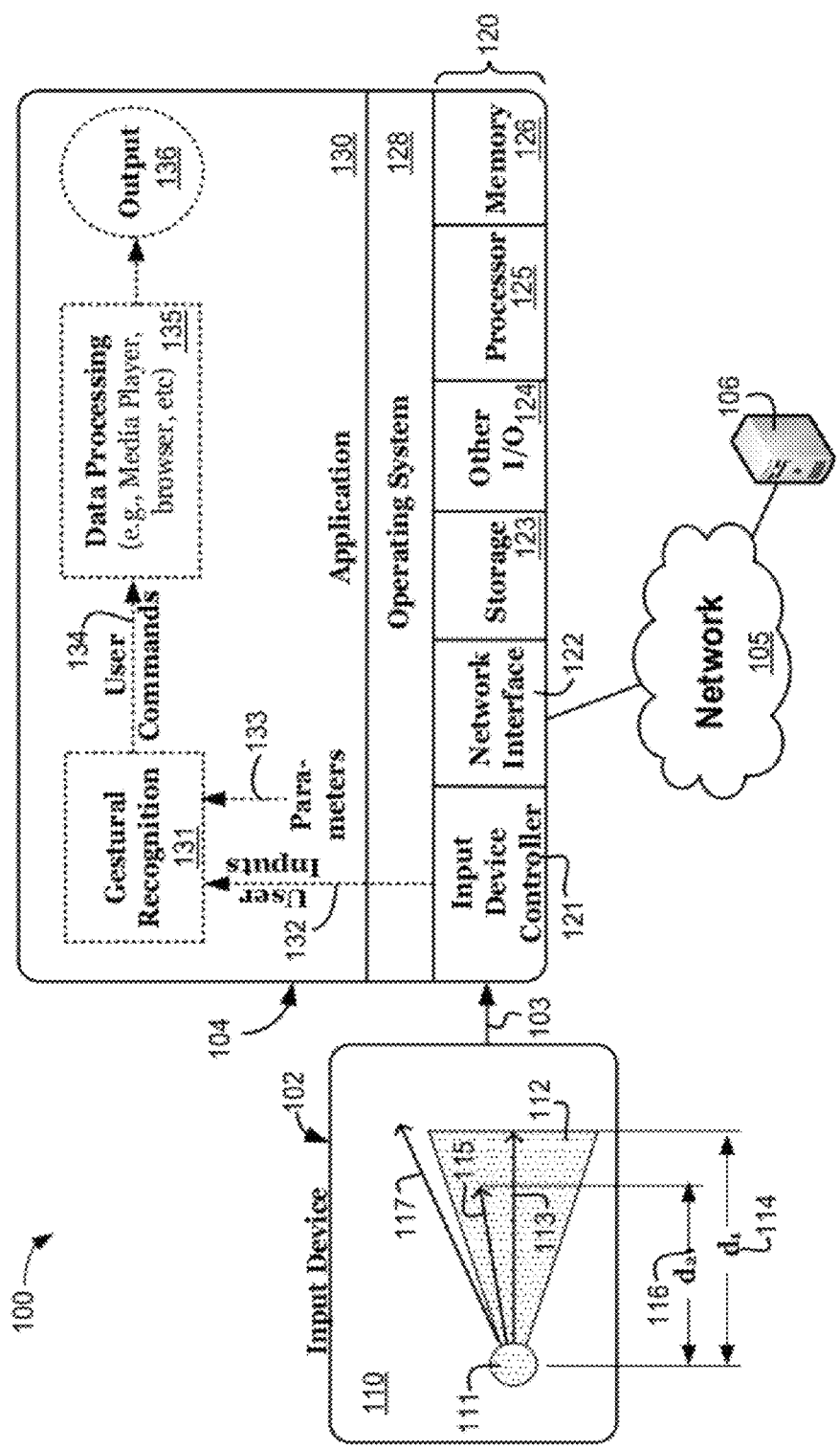

| | | | |
|---|---|---|---|
| 8,725,230 B2* | 5/2014 | Lisseman | A61B 5/01 180/272 |
| 8,976,129 B2* | 3/2015 | Lazaridis | G06F 3/0416 345/173 |
| 9,007,190 B2* | 4/2015 | Bosch | B60K 37/06 340/384.6 |
| 9,141,256 B2* | 9/2015 | MacKenzie | G06F 3/0481 |
| 2004/0143796 A1* | 7/2004 | Lerner et al. | 715/538 |
| 2005/0093868 A1* | 5/2005 | Hinckley | 345/502 |
| 2005/0198590 A1* | 9/2005 | Jarrett et al. | 715/863 |
| 2005/0198591 A1* | 9/2005 | Jarrett et al. | 715/863 |
| 2006/0085767 A1* | 4/2006 | Hinckley et al. | 715/863 |
| 2007/0124503 A1* | 5/2007 | Ramos et al. | 709/248 |
| 2010/0026647 A1* | 2/2010 | Abe et al. | 345/173 |
| 2010/0111358 A1 | 5/2010 | Chai et al. | |
| 2010/0185949 A1* | 7/2010 | Jaeger | 715/730 |
| 2010/0283742 A1* | 11/2010 | Lam | 345/173 |
| 2010/0315266 A1 | 12/2010 | Gunawardana et al. | |
| 2011/0010668 A1* | 1/2011 | Feldstein et al. | 715/822 |
| 2011/0035705 A1* | 2/2011 | Faenger et al. | 715/811 |
| 2011/0157025 A1* | 6/2011 | Hoover et al. | 345/173 |
| 2011/0258537 A1* | 10/2011 | Rives et al. | 715/255 |
| 2011/0291964 A1* | 12/2011 | Chambers et al. | 345/173 |
| 2011/0298720 A1* | 12/2011 | Nguyen et al. | 345/173 |
| 2012/0056818 A1* | 3/2012 | Shafi et al. | 345/173 |
| 2012/0092286 A1* | 4/2012 | O'Prey et al. | 345/174 |
| 2012/0096354 A1* | 4/2012 | Park et al. | 715/719 |
| 2012/0131513 A1* | 5/2012 | Ansell | 715/863 |

OTHER PUBLICATIONS

Canadian Intellectual Property Office, Office Action, dated Jun. 12, 2014 for Canadian Application No. 2,822,812.

European Patent Office, Rule 161(1) and 162 Communication, dated Sep. 5, 2013 for European Patent Application No. 11806021.9.

Canadian Office Action issued in Application No. 2,822,812 dated Jun. 22, 2015.

* cited by examiner

ND METHODS FOR ADAPTIVE
SYSTEMS AND METHODS FOR ADAPTIVE GESTURE RECOGNITION

TECHNICAL FIELD

The present invention generally relates to user interfaces, and more particularly relates to systems and methods for recognizing gestures from user inputs.

BACKGROUND

Many different computing devices such as portable or stationary computer systems, tablet computer systems, smart phones, personal digital assistants (PDAs), media players, electronic book ("ebook") readers and the like have become extraordinarily popular in recent years. Many of these devices incorporate user interfaces that respond to the user's touch, or to other inputs received in a two dimensional space. Examples of input devices that process multi-directional inputs include touch screens, touch pads, directional pads and the like, as well as more conventional mice, joysticks, etc. Many smart phones and tablet computers, for example, have user interfaces that are primarily (if not entirely) designed around touch screens that recognize inputs applied to the display by a user's finger, a stylus, or some other pointing object.

Often, multi-directional user inputs can be tracked over time or space and combined to form a single command commonly called a "gesture". A horizontal finger swipe, for example, may be recognized within a web browser or ebook reader as a gesture input to change pages, or to move forward or backward in a browsing history. A media player may recognize the same horizontal movement to perform other tasks, such as changing channels, performing a fast forward/rewind operation, or any other tasks as desired. Other gestures may involve vertical movements, rotational movements, taps, presses, holds and/or other user inputs tracked over time or over the multi-directional sensing region of the input device.

Often, however, certain devices may have difficulty in recognizing gestural inputs applied by certain users. While some users may intend to provide gestural inputs, their actual inputs applied to the sensing region of the device may be imperfect, and therefore difficult to recognize. If the user attempts to enter gestures that are not recognized by the input device, the user may become frustrated. Further, variations between different movements applied by different users can lead to gestural constraints that are overly restrictive for certain users, but that are nevertheless unable to recognize gestures produced by other users.

It is therefore desirable to improve recognition of gestures in user inputs detected by touch screens, touch pads, directional pads and/or other multi-directional input devices. These and other desirable features and characteristics will become apparent from the subsequent detailed description and the appended claims, taken in conjunction with the accompanying drawings and this background section.

BRIEF SUMMARY

According to various embodiments, systems and methods are described for adaptively recognizing gestures indicated by user inputs received from a touchpad, touchscreen, directional pad, mouse or other multi-directional input device. If a user's movement does not indicate a gesture using current gesture recognition parameters, additional processing can be performed to recognize the gesture using other factors. The gesture recognition parameters can then be adapted so that subsequent user inputs that are similar to the previously-rejected inputs will appropriately trigger gesture commands as desired by the user. In some embodiments, gestural data and/or parameters may be locally or remotely stored for further processing.

Various embodiments provide a method to process user inputs received from a multi-directional input device. The method may be executed by an input device itself, by device driver associated with an input device, by a processor or other component of a computing system that performs functions in response to software or firmware instructions, by a server that receives user input data via a network, and/or by any other processing device or logic. The method suitably comprises receiving at least one of the user inputs from the multi-directional input device; determining if the at least one user input forms a gesture based upon a set of parameters; if the at least one user input does not form the gesture based upon the set of parameters, attempting to recognize the gesture based upon other factors that are different from the set of parameters; and if the gesture is recognized based upon the other factors, adapting the set of parameters based upon the at least one user input.

Other embodiments suitably provide a computing system that comprises an input device having a multi-directional sensing region and a processor. The input device is configured to sense user inputs relative to a multi-directional sensing region and to provide output signals indicative of the sensed user inputs. The processor is configured to receive the output signals from the input device and to initially recognize gestures from at least some of the sensed user inputs indicated in the output signals based upon a set of parameters, and to recognize subsequent gestures based upon an adapted set of parameters that is adapted based upon previously-received user inputs.

Still other embodiments provide a method executable by a computing system, server or other data processing logic to process user inputs obtained from at least one multi-directional input device. The method suitably comprises receiving the user inputs; identifying at least some of the user inputs that are not recognized as gestures based upon a set of parameters, but that are recognized as gestures based upon other factors that are different than the set of parameters; and adapting the set of parameters based upon the identified user inputs to create an adapted set of parameters.

Various other embodiments, aspects and other features are described in more detail below.

BRIEF DESCRIPTION OF THE DRAWING FIGURES

Figure 2:
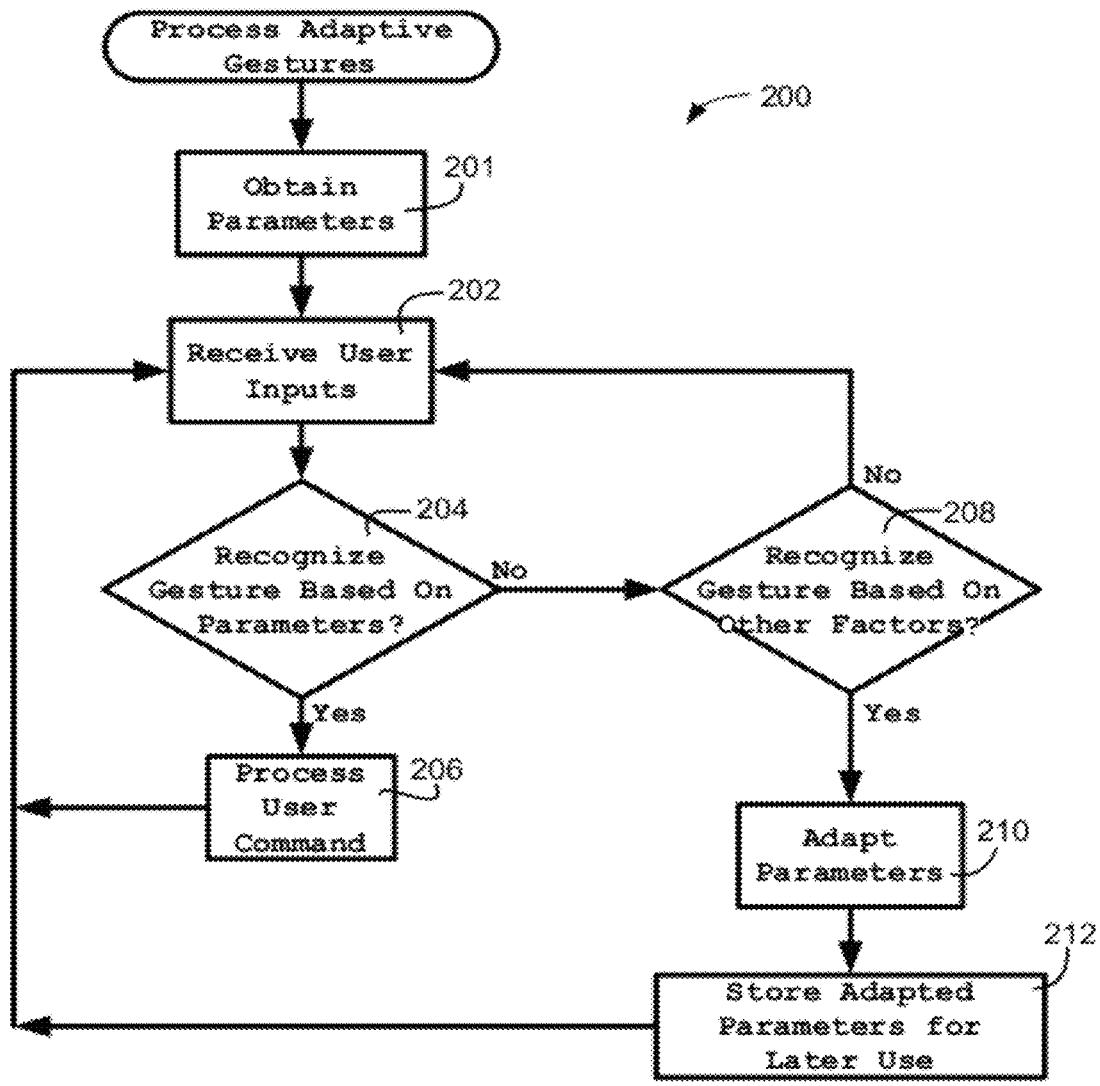

Exemplary embodiments will hereinafter be described in conjunction with the following drawing figures, wherein like numerals denote like elements, and FIG. 1 is a block diagram showing various components of an exemplary processing system that includes adaptive gesture recognition; and FIG. 2 is a flowchart of an exemplary process for adaptively recognizing gestures from user inputs.

DETAILED DESCRIPTION

The following detailed description of the invention is merely exemplary in nature and is not intended to limit the invention or the application and uses of the invention.

Furthermore, there is no intention to be bound by any theory presented in the preceding background or the following detailed description.

According to various embodiments, adaptive gesture recognition is applied within an application, a computer system, a hardware or software device driver and/or an input device to identify actual user behaviors and to adapt gestural recognition parameters based upon the actual behaviors of the user. If a particular user consistently makes shorter-than-expected movements for a particular gesture, for example, the parameters used to recognize that particular gesture can be adapted so that the user's actual behavior is recognized as producing the intended gesture. This can significantly reduce frustration by the user and greatly enhance user satisfaction with the adaptive product.

Adaptive gesture recognition may be applied with respect to particular users by storing the adapted parameters for use during subsequent sessions with the same user. In some implementations, the adapted parameters are stored locally at the user's input device or computer system. Other implementations may additionally or alternately store the adapted parameters at a network server or other shared location so that the user's adapted parameters are accessible from different computing systems. Still other embodiments may use aggregate data compiled from any number of users to adjust default settings, or to otherwise adapt the parameters used to recognize gestures used by multiple users of the same system or application. Other features, enhancements and other variations are described in increasing detail below.

Turning now to the drawing figures and with initial reference to FIG. 1, an exemplary system 100 could incorporate adaptive gestural recognition within an input device 102, a computing system 104, a device controller 121 and/or a software application 130, as appropriate. The system 100 illustrated in FIG. 1 shows a multi-dimensional input device 102 that provides signals 103 to a device controller 121 or other feature of computing system 104, which reports the received user inputs 132 to a gestural recognition module 131 or other feature of a software application 130. Gestural recognition module 131 suitably compares the user inputs 132 to gestural recognition parameters 133 to identify gestures in the user's movements 113, 115, 117. If a gesture is recognized, then a corresponding command 134 is provided to a media player, web browser, productivity application or other data processing module 135 as appropriate. The various features and functions of gestural recognition module 131 could be equivalently incorporated within the input device 102 itself, within the input device controller 121, within the operating system 128 of computing system 104, or in any other hardware or software processing logic within system 100, as desired.

Input device 102 is any device or component capable of sensing user inputs within a multi-dimensional input space 110. Input device 102 may be a touch pad, touch screen, touch stick, directional pad, joystick, mouse, trackball or the like, to name just a few examples. Typically, input device 102 detects user motions 113, 115, 117 within the sensing region 110, and provides corresponding output signals 103 to a device controller 121 or the like. Although FIG. 1 shows input device controller 121 as part of the hardware 120 associated with computing system 104, in practice device controller 121 may be implemented within a microcontroller or other processing circuitry that is physically and/or logically located within input device 102. Signals 103 may indicate the absolute ("X, Y"), relative ("$\Delta X, \Delta Y$") and/or other position of one or more inputs applied by the user. Such inputs may respond to a finger or stylus applied to a touchpad or touch screen, for example, or to the user's manipulation of a mouse, joystick, trackball or the like.

Although not shown in FIG. 1, input device 102 may also include a "select" button or similar feature that allows for selection of objects, as appropriate. Various gestures may incorporate actual or virtual "button pushes", such as presses or holds of actual mechanical buttons provided as part of input device 102. Other embodiments may also consider presses and/or holds of "virtual" buttons within sensing region 110. Any number of additional features, including presses, holds, clicks, multi-clicks, drags and/or the like may be similarly considered in any number of other embodiments.

Computing system 104 is any data processing device capable of processing user inputs to perform desired tasks. Various types of computing systems 104 may include, without limitation, any sort of portable or stationary personal computer or workstation, tablet computer system, media player, personal digital assistant, game playing system, mobile telephone, e-book reader, television, television receiver, audio receiver, consumer electronic device, appliance and/or the like.

Generally speaking, computing system 104 suitably includes conventional hardware 120 that processes data as directed by one or more software applications 130. FIG. 1, for example, shows computing system 104 as including a conventional processor 125 and memory 126, as well as any number of input/output interfaces, such as a network interface 122, disk or other storage interface 123, input device controller 121, and any additional input/output interfaces 124 (e.g., a display driver) as desired. Typically, applications 130 interact with the hardware 120 via any sort of conventional operating system 128. The exemplary features shown in FIG. 1 may be adapted or supplemented as desired to accommodate different hardware or software designs as may be appropriate for different types of computing systems 104.

Computing system 104 may, in some embodiments, communicate with a remote server 106 via a network 105. Server 106 may provide remote storage and retrieval of information, and/or any other data processing services as appropriate. Network 105 is any sort of local area, wide area or other network that supports data communications using any conventional protocols. Network 105 may represent a conventional wired or wireless LAN/WAN, the Internet, a telephone network, a corporate or other private network, and/or any other network or combination of networks as desired.

Gestures are recognized within system 100 in any manner. In various embodiments, a gesture is recognized when the user's movements applied within the sensing region 110 of input device 102 follow a track or pattern that is defined by one or more parameters 133, as appropriate. A horizontal swipe, for example, may be defined by parameters 133 specifying movement through sensing region 110 that proceeds from a starting position 111 and that remains within a confined region 112 for a particular distance 114. If signals 103 and/or user inputs 132 indicate that the user's motion follows path 113 from starting position 111 for a distance 114 in this example, then gestural recognition module 131 may appropriately recognize a "horizontal swipe" gesture. Any number of other gestures could be additionally or alternately considered, including any gestures correlating to movements in different directions (e.g., right-to-left, vertical movements, rotational movements and/or the like), movements of different velocities, movements applied at particular times or durations, taps, sequences of taps, tap and hold actions, tap and drag actions, tap-hold and drag actions, movements that begin or end at particular locations within sensing region 110, and/or the like.

Gestures suitably correlate to commands 134 provided to a web browser, media player or other data processing module 135. An exemplary media player could respond to the horizontal swipe, for example, by changing television channels, performing forward or backward navigation, or by otherwise adjusting an output 136 presented to the user. Web browsers, productivity applications or other data processing modules 135 may respond to the horizontal swipe gesture in any other manner, as desired. Although the example illustrated in FIG. 1 shows gestural recognition module 131 providing user commands 134 to a single data processing module 135, alternate embodiments could provide simultaneous and/or sequential commands 134 to any number of data processing modules representing different applications, programs or other processes executing within application space 130.

As noted above, however, the parameters 133 that define one or more gestures may not be ideally suited for some users. Some users may expect gestures to be recognized with longer or shorter movements, for example, or users may unwittingly provide imprecise movements within sensing region no that are not initially recognized as gestures. FIG. 1 shows an exemplary user movement 115 that lies within the confined region 112 for a horizontal swipe gesture, but that does not extend for the full distance 114 required to recognize the gesture based upon current parameters 133. FIG. 1 also shows an exemplary user movement 117 that extends for the expected distance 114, but that lies outside of the confined region 112. Motion 117 may result, for example, if the user's hand position differs from the expected position that would ordinarily provide properly horizontal movement. If the user moved along paths 115 or 117, then, such movements would not ordinarily fall within parameters 133 that define the region 112 associated with the gesture, so the gesture intended by the user would not be recognized.

By adapting parameters 133 based upon actual user inputs 132, however, the region 112 that defines one or more gestures can be modified to suit the actual behaviors of the user. If the user is observed to consistently move along path 115 without extending the full distance 114 typically needed to identify the gesture, for example, one or more parameters 133 could be adjusted so that movement for a shorter distance 116 triggered the gesture during subsequent operation. Similarly, consistent movement along path 117 could result in changes to parameters 133 that would place path 117 within the defined region 112 associated with the particular gesture. Other adaptations to parameters 133 may accommodate other user motions on sensing region no and/or other types of user inputs (e.g., button presses, holds, drags, etc.) as desired.

FIG. 2 shows an exemplary method 200 to process adaptive recognition of gestures indicated by user movements on a multi-directional input device 102. The particular functions and features shown in FIG. 2 may be executed, for example, by a gestural recognition module 131 executing in software 130 or firmware on computing system 104. In such embodiments, software instructions stored in memory 126 or storage 123 can be executed by processor 125 to carry out the various functions shown. Equivalent embodiments may execute some or all of method 200 within hardware, software and/or firmware logic associated with device controller 121, within operating system 128, within input device 102 itself, at a remote server 106, and/or in any other location using any sort of data processing logic. Some embodiments may perform functions 201-206 at a local computing system 104, for example, while performing functions 208-212 at a server that is accessible to the local computing system 104 via network 105. The various functions and features shown in FIG. 2 may be supplemented or modified in any number of equivalent embodiments.

Method 200 suitably includes receiving a user input 132 from the multi-directional input device 102 (function 202) and determining if a gesture is formed by the user input 132 based upon a set of parameters 133 (function 204). If the gesture is not formed based upon the set of parameters 133, the method may nevertheless attempt to recognize the gesture based upon other factors that are different from the set of parameters 133 (function 208). If the gesture is recognized based upon the other factors, one or more of the parameters 133 can be adapted (function 210) as desired. In some embodiments, the adapted parameters may be locally and/or remotely stored (function 212) for subsequent retrieval (function 201), or for any other purpose.

The various parameters 133 that define gestural movements within sensing region 110 may be initially defined in any manner (function 201). In various settings, the parameters 133 are initially defined based upon default values, based upon expectations or behavior of average users, and/or upon any other factors. Some embodiments may initially define parameters 133 to be relatively stringent (e.g., to prevent false recognition of unintended gestures), or to be relatively permissive (e.g., to allow relatively imprecise movement by the user to trigger a gesture). In some embodiments, the permissivity of gesture recognition parameters 133 may be selected and adjusted by the user or an administrator using conventional user interface features, as desired. Some embodiments may initially obtain parameters 133 from a local source, such as from default values configured in module 131, from prior parameters 133 stored in memory 126 or storage 123, and/or the like. Other implementations may initially obtain parameters 133 from a remote service (e.g., server 106 via network 105), as described more fully below.

User inputs 132 are received in any manner (function 202). User inputs 132 are any signals or data that can be processed to ascertain the user's motion with respect to sensing region 110 of input device 102. In the implementation described above, user inputs 132 are received at a gestural recognition module 131 from device controller 121, which suitably constructs the user input signals 132 from the raw motion signals 103 received from the input device 102 itself. Other embodiments may not provide signals 103 that are separately-identifiable from user inputs 132. Still other embodiments may incorporate gesture recognition within device controller 121 so that gestural commands 134 issue directly from controller 121. Other embodiments may combine or otherwise process the information contained within signals 103, 132 and 134 in any other manner.

If the user inputs 132 indicate movement within the parameters 133 that define an existing gestural region 112, then a gesture can be readily identified (function 204), and a user command 134 can be issued, or otherwise processed (function 206). If function 204 does not recognize a gesture based upon the then-current parameters 133, however, then additional processing may take place as desired. In some implementations, unrecognized gestures may be initially (and erroneously) processed as cursor movement, scrolling or other default behaviors if a gesture cannot be identified in any other manner.

Various embodiments further attempt to recognize gestures from the received user inputs 132 using other factors (function 208). The other factors may include, for example, an approximation of the parameters 133, subsequent actions taken by the user, the setting in which the user's input was provided, and/or other factor as desired. Repetition and context may also be considered in various embodiments. Function 208 may be performed in real time as the user inputs are received in some embodiments. Equivalently, function 208 may be performed at a later time so that subsequent user inputs may also be considered, or for any other reason. As noted above, functions 208-212 may be processed at a server 106 or other location that is remote from the user input device 102. Such embodiments may support batch processing, or processing of inputs received from any number of users and/or devices on any temporal basis.

Gesture recognition in function 208 may consider any appropriate information or other factors. To recognize an intended gesture based upon an approximation, for example, various embodiments could consider gestures having parameters 133 that most closely match the actual movements indicated by the user inputs 132. FIG. 1, for example, shows two movements 115 and 117 that may be close enough to movement 113 that the user's intentions can be inferred. Within the context of an application where a gesture input is expected, for example, the "closest" gesture can be more readily determined. A media player application 135, for example, may limit cursor movement or other non-gestural interface features in some settings and situations so that navigation or other gestural controls can be more readily isolated and recognized.

Other embodiments may recognize intended gestures based upon subsequent user inputs 132. If a user tries unsuccessfully to trigger a gesture command 134, he or she will often try again to complete the same action. If a particular sequence of user movements is not initially recognized, then, subsequent user movements that result in a recognized gesture can be compared to the earlier movements to determine whether the earlier movements represented an attempt to provide gestural input.

If the user makes multiple unsuccessful attempts to complete the same gesture, the data from the prior attempts may also be considered for both recognizing the gesture and modifying the parameters 133 associated with the gesture, as appropriate. Although the unsuccessful gesture attempts may not be recognized in time to complete the intended action, they may nevertheless provide additional data that can improve future gesture recognition in some embodiments. Other embodiments may consider any number of alternate or additional features or gesture recognition techniques, as desired.

When a gesture is recognized based upon the factors other than the then-current parameters 133 (function 208), then the parameters 133 may be adapted as desired (function 210) to more closely correspond with the user's intended actions. In the horizontal swipe gesture described with respect to FIG. 1, for example, a movement 115 that extends for a shorter distance 116 than the parameter distance 114 could result in changing the parameter distance to a value that is more in line with user expectations. Similarly, a movement along path 117 could result in changing the parameters 133 that define region 112, as appropriate.

Various embodiments may not necessarily adapt parameters 133 upon each recognized gesture, but may instead make adaptations based upon repetitive behaviors observed over time. If a user is consistently observed to make shorter movements 115 instead of intended movements 113, for example, the distance parameter may be modified only after a threshold number of intended gestures have been recognized.

The amount of adaptation may be similarly determined in any manner. Various embodiments may adjust spatial or temporal parameters (e.g., distance 114, or the layout of region 112, time between clicks or button presses, etc.) based upon averages or other combinations of data obtained from multiple gesture attempts. Some embodiments may consider data from successful as well as unsuccessful gesture recognition. Various embodiments may apply any sort of adaptation algorithms or heuristics that could modify the occurrence, magnitude and/or frequency of parameter updates as desired.

The adapted parameters 133 are appropriately stored for subsequent use or analysis (function 212). In some embodiments, the adapted parameters 133 are stored locally at computing system 104 (e.g., in memory 126, disk or other storage 123, or elsewhere) for retrieval and use during subsequent operations. In other embodiments, the adapted parameters 133 are stored remotely (e.g., on server 106) so that the user may obtain his or her customized settings even while using other computing systems 104, or to permit analysis of the gestures attempted by multiple users so that default or other settings of parameters 133 can be improved.

To that end, some embodiments may additionally or alternately allow server 106 to receive adjusted parameters 133 and/or user inputs 132 from any number of users, input devices 102 and/or computing systems 104. Server 106 may therefore analyze empirical data obtained from multiple users to thereby generate improved default or other values for parameters 133.

As noted above, then, functions 208 and 210 may be performed at a remotely-located server 106 based upon user inputs 132 received from computing system 104. While such analysis may not necessarily support real-time recognition of intended gestures, it would nevertheless allow the initial parameters obtained at function 201 to be improved over time. The adapted parameters 133 could then be returned to computing system 104 as part of function 201, or otherwise as appropriate. The parameters 133 that are obtained in function 201 could be determined solely based upon inputs received from a particular user or from a particular computing system to optimize gesture recognition for a particular user. Alternately, the obtained parameters 133 could be based upon information obtained from multiple users operating multiple computing systems 104, as appropriate. Parameters may be adapted based upon the individual user behaviors and/or shared behaviors of multiple users, as desired. The resulting adapted parameters 133 can then be shared from server 106 with any number of users, computing system 104 and/or input devices 102 as desired. To that end, function 201 in some embodiments could involve obtaining or updating initial parameters 133 from server 106 or elsewhere on any regular or irregular temporal basis, or as otherwise needed.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method to process user inputs received from a multi-directional input device, the method comprising:
receiving at least one of the user inputs from the multi-directional input device, the at least one of the user inputs defining an original movement by a user;
determining if the at least one user input forms a gesture based upon a set of parameters, wherein the parameters outline a confined two-dimensional spatial region of the multi-directional input device that defines the gesture;
if the at least one user input does not form the gesture based upon the two-dimensional spatial region that defines the gesture, attempting to recognize the gesture based upon non-spatial factors that are different from the set of parameters; and
if the gesture is recognized based upon the non-spatial factors, adapting at the two-dimensional spatial region of the multi-directional input device that defines the gesture based upon the at least one user input so that the confined two-dimensional spatial region of the multi-directional input device that defines the gesture is changed to include the original movement by the user.

2. The method of claim 1 further comprising associating the adapted two-dimensional spatial region with each of a plurality of users and storing the adapted two-dimensional spatial region associated with each user in a storage as user-specific data.

3. The method of claim 2 further comprising retrieving the user specific data associated with the particular user prior to performing subsequent determination of gestures formed by subsequent user inputs by the same one of the plurality of users, and using the user specific data associated with the particular user as the non-spatial data in subsequent gesture recognition.

4. The method of claim 2 wherein the adapted two-dimensional spatial region is stored at a remotely-located server system accessible via a network.

5. The method of claim 4 further comprising retrieving the two-dimensional spatial region from the remotely-located server system prior to the determining.

6. The method of claim 1 further comprising issuing a user command in response to the gesture if the gesture is recognized from either the set of parameters or the non-spatial factors.

7. The method of claim 1 wherein the non-spatial factors comprise subsequent actions taken by the user.

8. The method of claim 1 wherein the non-spatial factors comprise a setting in which the user inputs are received.

9. The method of claim 1 wherein the non-spatial factors comprise subsequent user inputs received after the at least one user input.

10. The method of claim 1 wherein the set of parameters comprises a distance travelled for at least one gesture, and wherein the adapting comprises shortening the distance travelled for the at least one gesture based upon the non-spatial factors.

11. The method of claim 1 wherein the shortening comprises setting a new distance based upon a distance travelled in the at least one user input.

12. A computing system comprising:
an input device having a multi-directional sensing region, wherein the input device is configured to sense user inputs relative to a multi-directional sensing region that are applied by a user and to provide output signals indicative of the sensed user inputs; and
a processor configured to receive the output signals from the input device and to initially recognize gestures made by the particular user from at least some of the sensed user inputs indicated in the output signals based upon confined two-dimensional regions of the input device that each correspond to one of the gestures, and, when the user inputs applied by the particular user are not initially recognized, the processor attempting to recognize the gesture based upon user-specific gesture data previously-stored for that particular user, and to adapt the confined two-dimensional regions of the input device corresponding to at least one gesture for that particular user based upon the previously-received user inputs so that the confined two-dimensional region of the input device corresponding to the at least one gesture subsequently includes the user input previously applied by the particular user.

13. The computing system of claim 12 further comprising a network interface configured to facilitate communication on a network, and wherein the processor is configured to communicate with a server on the network via the network interface.

14. The computing system of claim 13 wherein the processor is further configured to provide at least some of the sensed user inputs to the server on the network to thereby allow the server to adapt at least some of the parameters in response to the sensed user inputs, and wherein the processor is further configured to receive the adapted set of parameters from the server on the network.

15. The computing system of claim 14 the set of parameters received from the server on the network is adapted based upon user inputs provided by a plurality of different users each operating a different one of a plurality of computing systems.

16. The computing system of claim 12 wherein the adapted set of parameters is associated with the particular user of a plurality of users and stored in a data storage, and wherein the adapted set of parameters are retrieved from the data storage for subsequent use of the computing system by the particular one of the plurality of users.

17. A computer-executable method to process user inputs obtained from at least one multi-directional input device, the method comprising:
receiving a set of parameters that defines one or more confined two-dimensional regions of the multi-directional input device, each of the confined two-dimensional regions corresponding to one of the one or more two-dimensional gestures applied to the multi-directional input device;
receiving the user inputs;
recognizing at least some of the user inputs as two-dimensional gestures by comparing the user inputs to the set of parameters;
identifying at least some of the user inputs as two-dimensional gestures based upon non-spatial factors that are different than the set of parameters;
adapting the set of parameters based upon the identified user inputs to create an adapted set of parameters in which the confined two-dimensional regions of the multi-directional input device corresponding to the two-dimensional gestures are changed to subsequently include the identified user inputs; and
storing the adapted set of parameters for subsequent retrieval.

18. The method of claim 17 wherein the method is executable by a server that receives the user inputs from each of a plurality of computing systems and that provides the adapted set of parameters to each of the plurality of computing systems via a network.

19. The method of claim 17 wherein the method is executable by a processor in a computing system that comprises the at least one multi-directional input device, wherein the adapted set of parameters is associated with a particular one of a plurality of users of the computing system, and wherein the processor is configured to recognize gestures in subsequent user inputs made by the same particular user of the computing system based upon the adapted set of parameters associated with that particular user.

20. The method of claim 17 wherein the identifying comprises comparing at least some of the user inputs to subsequently-received user inputs that were recognized as gestures.

* * * * *